US012640934B2

(12) United States Patent
Germouty

(10) Patent No.: US 12,640,934 B2
(45) Date of Patent: May 26, 2026

(54) NON-NATIVE BLOCKCHAIN SIGNATURES

(71) Applicant: nChain Licensing AG, Zug (CH)

(72) Inventor: Paul Germouty, London (GB)

(73) Assignee: nChain Licensing AG, Zug (CH)

( * ) Notice: Subject to any disclaimer, the term of this patent is extended or adjusted under 35 U.S.C. 154(b) by 25 days.

(21) Appl. No.: 18/858,177

(22) PCT Filed: Apr. 24, 2023

(86) PCT No.: PCT/EP2023/060586
§ 371 (c)(1),
(2) Date: Oct. 18, 2024

(87) PCT Pub. No.: WO2023/208809
PCT Pub. Date: Nov. 2, 2023

(65) Prior Publication Data
US 2025/0274292 A1      Aug. 28, 2025

(30) Foreign Application Priority Data
Apr. 26, 2022      (GB) ..................................... 2206039

(51) Int. Cl.
*H04L 9/08*              (2006.01)
*G06Q 20/38*          (2012.01)
(Continued)

(52) U.S. Cl.
CPC ..... *H04L 9/3252* (2013.01); *G06Q 20/38215* (2013.01); *G06Q 20/3825* (2013.01);
(Continued)

(58) Field of Classification Search
CPC ... H04L 9/3252; H04L 9/0825; H04L 9/3236; H04L 9/3249; H04L 9/3268; H04L 9/50;
(Continued)

(56) References Cited

U.S. PATENT DOCUMENTS 10,901,983  B2 *    1/2021   Zhang ................. G06F 16/2379
2019/0305966  A1 *  10/2019  Qiu ........................ H04L 9/3239
(Continued)

FOREIGN PATENT DOCUMENTS

WO        2023143882  A1      8/2023

OTHER PUBLICATIONS

Ansi, "X9.62-1998, Public Key Cryptography for the Financial Services Industry: The Elliptic Curve Digital Signature Algorithm (ECDSA)," American National Standards Institute , 1998, 128 pages.
(Continued)

*Primary Examiner* — Hany S. Gadalla
(74) *Attorney, Agent, or Firm* — Galvani Smith PLLC

(57)      ABSTRACT
A computer-implemented method for enabling non-native blockchain signatures to be verified in-script, wherein the method is performed by a first party and comprises: obtaining a second blockchain transaction, wherein the second blockchain transaction references a first blockchain transaction; generating a first signature based on at least the second blockchain transaction, wherein a first private key used to generate the first signature is set equal to one; generating a second signature based on the first signature, wherein the first signature is a native blockchain signature and the second signature is a non-native blockchain signature; including the first signature and the second signature in an unlocking script of the second blockchain transaction for verification when the unlocking script is executed together with a locking script of the first blockchain transaction; and causing the second blockchain transaction to be submitted to a blockchain network.

19 Claims, 6 Drawing Sheets

(51) Int. Cl.
    *G06Q 20/40*          (2012.01)
    *H04L 9/00*           (2022.01)
    *H04L 9/32*           (2006.01)
(52) U.S. Cl.
    CPC ....... *G06Q 20/3829* (2013.01); *G06Q 20/401*
            (2013.01); *H04L 9/0825* (2013.01); *H04L*
            *9/3236* (2013.01); *H04L 9/3249* (2013.01);
            *H04L 9/3268* (2013.01); *H04L 9/50* (2022.05)
(58) Field of Classification Search
    CPC ..... H04L 9/006; H04L 9/3073; H04L 9/3247;
            H04L 9/14; H04L 9/083; H04L 9/0847;
            H04L 9/085; H04L 9/0866; H04L 9/0877;
            H04L 9/3255; H04L 9/3257; H04L
            9/3066; G06Q 20/38215; G06Q 20/3825;
            G06Q 20/3829; G06Q 20/401; G06Q
            20/06; G06Q 20/223; G06Q 20/3823
    See application file for complete search history.

(56)                 References Cited

U.S. PATENT DOCUMENTS

2022/0012731 A1*  1/2022  DeRosa-Grund ... G06F 16/2365
2022/0385477 A1*  12/2022  Kravitz ................. H04L 9/3247

OTHER PUBLICATIONS

Boneh D., et al., "Hierarchical Identity Based Encryption with Constant Size Ciphertext," Advances in Cryptology—EUROCRYPT, Annual International Conference on the Theory and Applications of Cryptographic Techniques, 2005, vol. 3493, pp. 440-456.

Boneh D., et al., "Identity-Based Encryption from the Weil Pairing," Advances in Cryptology—CRYPTO, Lecture Notes in Computer Science, 2001, vol. 2139, pp. 213-229.

Chatterjee S., et al., "Galindo-Garcia Identity-Based Signature, Revisited," Information Security and Cryptology—ICISC 2012, vol. 7839, 27 pages.

Cooper D., et al., "Internet X.509 Public Key Infrastructure Certificate and Certificate Revocation List (CRL) Profile," RFC 5280, [Online], May 2008, 151 pages, Available: https://datatracker.ietf.org/doc/html/rfc5280.

Ding J., et al., "Rainbow, a New Multivariable Polynomial Signature Scheme," Applied Cryptography and Network Security (ACNS 2005), LNCS 3531, 2005, pp. 164-175.

Ducas L., et al., "CRYSTALS-Dilithium: A Lattice-Based Digital Signature Scheme," IACR Transactions on Cryptographic Hardware and Embedded Systems, 2018, pp. 1-31.

Fouque P.-A., et al., "Falcon: Fast-Fourier Lattice-based Compact Signatures over NTRU," Submission to the NIST's Post-Quantum Cryptography Standardization Process, 2018, 75 pages.

Fuchsbauer G., et al., "Blind Schnorr Signatures and Signed ElGamal Encryption in the Algebraic Group Model," Advances in Cryptology-EUROCRYPT 2020: 39th Annual International Conference on the Theory and Applications of Cryptographic Techniques, 2020, 44 pages.

Galindo D., et al., "A Schnorr-Like Lightweight Identity-Based Signature Scheme," Progress in Cryptology—AFRICACRYPT 2009, vol. 5580, pp. 135-148.

Gentry C., et al., "Hierarchical ID-Based Cryptography," Advances in Cryptology—ASIACRYPT 2002: 8th International Conference on the Theory and Application of Cryptology and Information Security, 2002, pp. 548-566.

Joux A., "A One Round Protocol for Tripartite Diffie-Hellman," Algorithmic No. Theory (ANTS 2000), LNCS 1838, 2000, pp. 385-393.

Kiltz E., et al., "Identity-Based Signatures," In Identity-based Cryptography, 2009, vol. 2, 17 pages.

Koblitz N., et al., "Critical Perspectives on Provable Security: Fifteen Years of Another Look Papers," Cryptology ePrint Archive, 2019, 47 pages.

McCurley K.S., "The Discrete Logarithm Problem," In Proceedings of Symposia in Applied Mathematics, 1990, vol. 42, pp. 49-74.

Nick J., et al., "MuSig2: Simple Two-Round Schnorr Multi-Signatures," Annual International Cryptology Conference. Cham: Springer International Publishing, 2021, 50 pages.

Ong H., et al., "Efficient Signature Schemes Based on Polynomial Equations," Advances in Cryptology—CRYPT0 '84, LNCS 196, 1985, pp. 37-46.

Shamir A., "Identity-based Cryptosystems and Signature Schemes," Advances in Cryptology—CRYPT0 '84, LNCS 196, 1985, pp. 47-53.

Tartan C., et al., "A Scalable Bitcoin-based Public Key Certificate Management System," In Proceedings of the 18th International Conference on Security and Cryptography (SECRYPT) 2021, pp. 548-559.

* cited by examiner

Transaction
from Alice to Bob

Validated by running: Locking
script from output 203 of $Tx_0$,
together with Alice's unlocking
script from input 202 of $Tx_1$. This
checks that Alice's unlocking script
in $Tx_1$ meets the condition(s)
defined in the locking script of
previous transaction $Tx_0$.

Blockchain
Network

Tx1

Tx2

103a

Bob

Public key

Alice

103b

Identifier

Private key

Key
Generator

301

NON-NATIVE BLOCKCHAIN SIGNATURES

CROSS REFERENCE TO RELATED APPLICATIONS

This application is the U.S. National Stage of International Application No. PCT/EP2023/060586 filed on Apr. 24, 2023, which claims the benefit of United Kingdom Patent Application No. 2206039.6, filed on Apr. 26, 2022, the contents of which are incorporated herein by reference in their entireties.

TECHNICAL FIELD

The present disclosure relates to a method of verifying non-native blockchain signatures in-script and to a method of using non-native blockchain signatures for verification in-script.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process time-stamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed—to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

SUMMARY

Digital signatures are cryptographic primitives that provide authenticity and integrity of a message. They are typically computed using a private signing key and verified using a public verification key. Digital signatures are a fundamental aspect of most, if not all, blockchain protocols. They are used for, amongst other things, signing transactions. Most blockchain protocols have a native digital signature scheme. For example, the Bitcoin blockchain makes use of ECDSA signatures. A native signature, in a blockchain context, is one that can be verified in-script using a dedicated verification function (e.g. opcode) to verify the signature. For example, the Bitcoin protocol uses the OP_CHECKSIG opcode, or variants of, to verify ECDSA signatures. A native signature may also be defined as a signature that, when verified by the dedicated function, causes the dedicated function (or more accurately a script engine) to generate the signed message based on the actual transaction data, and verify the signature based on the generated message. Put another way, a native signature verification function verifies a native signature by constructing a candidate message using the actual transaction data (available to the signature verification function), and verifying the signature based on the constructed candidate message. By verifying the native signature based on a message constructed from the actual transaction data (i.e. the spending transaction and, in some cases, the referenced transaction), the native signature provides integrity of the signed message.

Whilst the native signature scheme is fundamental to a given blockchain protocol, its functionality is limited. It would therefore be desirable to be able to use other, non-native signature schemes on the blockchain. However, since only the native signature scheme causes the script engine to construct the message, the integrity of non-native signatures cannot be verified. In the context of the blockchain, this means that the integrity of the spending transaction containing the signature cannot be guaranteed. Therefore the challenge remains of how to improve the functionality of the blockchain by making use of non-native signatures, whilst guaranteeing the integrity of signed transaction is maintained.

According to one aspect disclosed herein, there is provided a computer-implemented method for enabling non-native blockchain signatures to be verified in-script, wherein the method is performed by a first party and comprises: obtaining a second blockchain transaction, wherein the second blockchain transaction references a first blockchain transaction; generating a first signature based on at least the second blockchain transaction, wherein a first private key used to generate the first signature is set equal to one; generating a second signature based on the first signature, wherein the first signature is a native blockchain signature and the second signature is a non-native blockchain signature; including the first signature and the second signature in an unlocking script of the second blockchain transaction for verification when the unlocking script is executed together with a locking script of the first blockchain transaction; and causing the second blockchain transaction to be submitted to a blockchain network.

The first party obtains (e.g. generates or receives) the second transaction. The second transaction has an input that references a first transaction, i.e. an unspent transaction output of the first transaction. The first party signs a message based on the second transaction to generate a first signature. The first signature is a signature native to the blockchain, e.g. an ECDSA signature. The private key used to generate the first signature is set to one, i.e. the private key is equal to the number one, meaning that its generation and verification and very computationally efficient.

The first party then signs a message based on the first signature to generate a second signature. The second signature is not native to the blockchain. E.g. if the first signature is an ECDSA signature then the second signature is not an ECDSA signature. The second signature may be of any signature scheme. The first party includes both the first and second signatures in an unlocking script of the input of the second transaction. When the unlocking script is executed, the first signature will be verified, thus guaranteeing the integrity of the second transaction. The second signature provides the benefits of whichever scheme is chosen. Generally, the second signature scheme may provide authenticity of the signed message. Thus the combination of the first signature and the second signature provide both authenticity and integrity of the second transaction.

According to one aspect disclosed herein, there is provided a computer-implemented method of verifying non-native blockchain signatures in-script, wherein the method is performed by a second party and comprises: generating a first blockchain transaction comprising a locking script, wherein the locking script comprises a first verification script and a second verification script, wherein when the locking script of the first blockchain transaction is executed together with an unlocking script of a second blockchain transaction, the first verification script is configured to verify a first signature based on a first public key corresponding to a first private key set equal to one, and the second verification script is configured to verify a second signature, wherein the first signature is a native blockchain signature and the second signature is a non-native blockchain signature; and causing the first blockchain transaction to be submitted to a blockchain network.

The second party verifies the first transaction. The first transaction has an output containing a locking script. The locking script contains two verification scripts. A first verification script is configured to, when executed, cause a script engine to verify native signatures, e.g. ECDSA signatures. This verification involves the script engine constructing a candidate version of the signed message (i.e. a message based at least on the second transaction), and validating the first signature based on the candidate message and a public key. The public key corresponds to the number one. The second verification script is configured to verify a non-native signature. When the second verification script is executed, the script engine does not construct a candidate message based on the second transaction. If the script execution passes, the integrity of the second transaction is verified (by way of the valid native signature), as is the non-native signature.

In some embodiments, the non-native signature may be an identity-based signature. An identity-based signature (IBS) is a type of digital signature that removes the need for a public verification key. Instead, only the identity of the signer is needed for the verification of a signature (along with a message and some public parameters). These embodiments enable the integrity of the second transaction to be guaranteed, whilst also providing authenticity of the transaction, since the second, non-native signature is linked to an identity of the first party.

In general any non-native signature scheme can be used, thus improving the blockchain by making use of the advantages associated with the particular signature scheme.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 3 is a schematic block diagram of a system for implementing verification of non-native blockchain signatures, FIGS. 4A 4B schematically illustrate the use of a dummy signature to generate and verify an identity-based signature, FIGS. 5A and 5B schematically illustrate the use of a dummy signature to generate and verify a general signature, and FIG. 6 schematically illustrates the use of identity-based signatures to revoke on-chain certificates.

DETAILED DESCRIPTION OF EMBODIMENTS

1. Example System Overview

Figure 1:
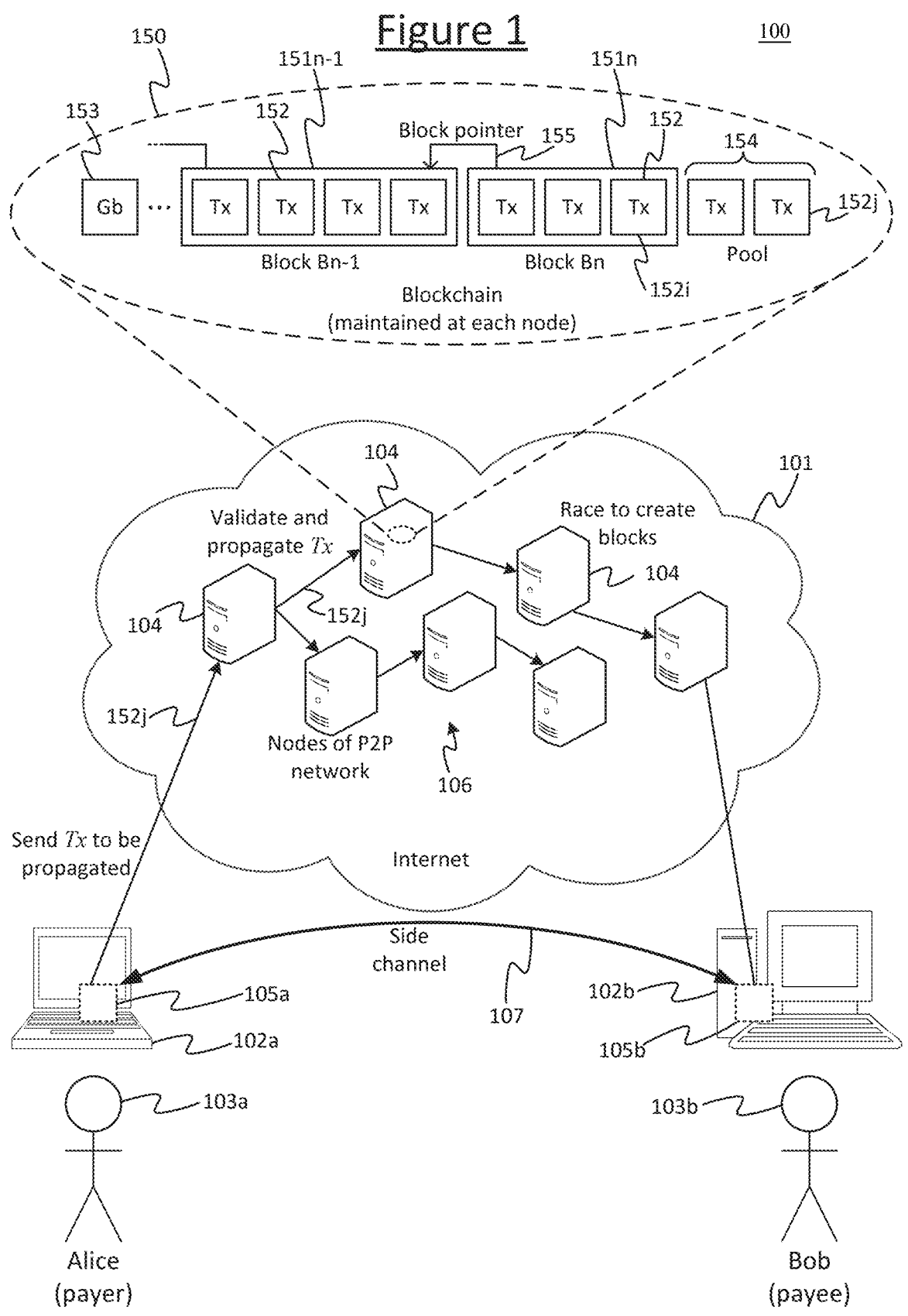
FIG. 1 is a schematic block diagram of a system for implementing a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152j, the (or each) input comprises a pointer referencing the output of a preceding transaction 152i in the sequence of transactions, specifying that this output is to be redeemed or "spent" in the present transaction 152j. Spending or redeeming does not necessarily imply transfer of a financial asset, though that is certainly one common application. More generally spending could be described as consuming the output, or assigning it to one or more outputs in another, onward transaction. In general, the preceding transaction could be any transaction in the ordered set 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the input authorisation, for example the signature of the user 103a to whom the output of the preceding transaction 152i is locked. In turn, the output of the present transaction 152j can be cryptographically locked to a new user or entity 103b. The present transaction 152j can thus transfer the amount defined in the input of the preceding transaction 152i to the new user or entity 103b as defined in the output of the present transaction 152*j*. In some cases a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152*j* (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typi- cally requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction spends (or "assigns"), wherein this condition typically comprises at least checking that the cryptographic signature or other authorisation in the input of the new transaction 152*j* unlocks the output of the previous transac- tion 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated through- out the network of blockchain nodes 104.

In an output-based model, the definition of whether a given output (e.g. UTXO) is assigned (or "spent") is whether it has yet been validly redeemed by the input of another, onward transaction 152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propa- gated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predeter- mined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other block- chain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previ- ously created block 151*n*-1 in the chain. The significant amount of effort, for example in the form of hash, required to create a proof-of-work solution signals the intent of the first node 104 to follow the rules of the blockchain protocol. Such rules include not accepting a transaction as valid if it spends or assigns the same output as a previously validated transaction, otherwise known as double-spending. Once created, the block 151 cannot be modified since it is recog- nized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore pro- vides an immutable public ledger of the transactions.

Note that different blockchain nodes 104 racing to solve the puzzle at any given time may be doing so based on different snapshots of the pool of yet-to-be published trans- actions 154 at any given time, depending on when they started searching for a solution or the order in which the transactions were received. Whoever solves their respective puzzle first defines which transactions 152 are included in the next new block 151*n* and in which order, and the current pool 154 of unpublished transactions is updated. The block- chain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151n. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151n in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152*j*, it handles it in accordance with the blockchain node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

2. UTXO-Based Model

Figure 2:
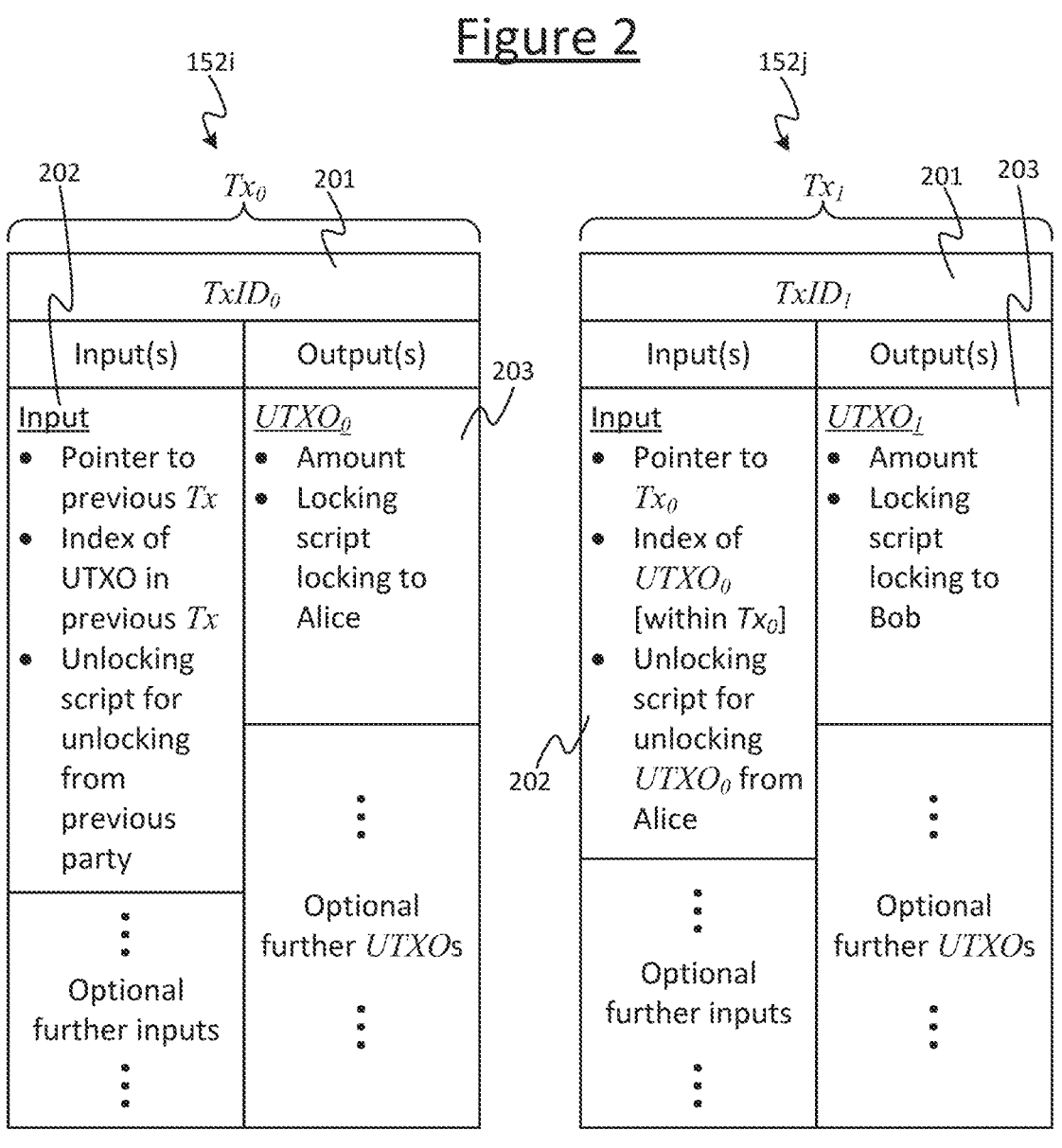
FIG. 2 schematically illustrates some examples of transactions which may be recorded in a blockchain.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "Tx₁". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

$$<\text{Sig } P_A><P_A>\|[\text{Checksig } P_A]$$

where "| |" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned (or spent) by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_ . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

3. Side Channel

As shown in FIG. 1, the client application on each of Alice and Bob's computer equipment 102a, 120b, respectively, may comprise additional communication functionality. This additional functionality enables Alice 103a to establish a separate side channel 107 with Bob 103b (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

4. Cryptographic Primitives

4.1 Elliptic Curves

In general the embodiments described herein may use any suitable elliptic curve. For example, the embodiments ma use elliptic curves (ECs) of the form $$y^2 = x^3 + ax + b \bmod p$$

over prime fields $\mathbb{F}_p$, with $\Delta := -16(4a^3 + 27b2) \neq 0 \bmod p$. An example of such a curve is secp256k1 which is used in Bitcoin. The order of this curve is denoted by n.

The multiplication of a point P on the elliptic curve by a $\in \mathbb{F}_n$ is represented as a·P, which is defined as:

$$a \cdot P = P + P + \dots P$$

where + is the elliptic curve addition. Note that from herein the mod n notation is omitted and it is assumed that all arithmetic operations over integers are done modulo n.

4.2 Digital Signature

In a digital signature setting, each party has their own private signing key to be used for signing, and a corresponding public verification key that is used for signature verification. A digital signature scheme comprises four polynomial time algorithms:

Setup ( $\mathfrak{K}$ ):

Generates the global parameters param respecting the security parameter $\mathfrak{K}$.

KeyGen (param):

Generates a private key sk.

Derives the public verification key vk from the private key and publishes it to all parties.

Sign (m, sk; r)

Sign a message m, using the private signing key sk and randomness r to obtain the signature σ.

Verify (m, σ, vk)

This outputs 1, if the signature σ is a valid signature on the message m, meaning that it has been computed using the private key corresponding to the public key vk. Otherwise, it outputs 0.

An algorithm is said to be of polynomial time if its running time is upper bounded by a polynomial expression in the size of the input for the algorithm: $T(n) = \mathcal{O}(n)^k$. This is often a necessary condition to have a practical algorithm execution.

4.3 Public Key Infrastructure

Public Key Cryptography (PKC), to a large extent, enables secret sharing in symmetric-key settings. However, there remains a problem, which is how to ensure that the public key of a party, say Alice 103a, indeed belongs to Alice. If it is inadvertently corrupted or if any malicious party was able to replace Alice's public key with their own, they will be able to decrypt all messages that were meant for Alice. If the malicious party then encrypts the message with the real public key of Alice, she will never notice any problem. The malicious player can be passive and only read messages, or they can change them entirely or partially. This attack is called man-in-the-middle attack. There is no easy way for any other party to distinguish between Alice's real key and that of the malicious player. In general, the public key of Alice $PK_{Alice}$ is at least 256 bits of random-looking string. For 128 bits of AES security the public key size is 256 bits for a scheme based on elliptic curves or 3072 bits for an RSA scheme (signature or encryption). Other schemes may use different size keys.

To address this problem Public Key Infrastructure (PKI) is often used. A digital certificate consisting of a message that contains Alice's public key and Alice's identifier is created by a Certification Authority (CA). Then it is hashed and signed by the CA. A Certificate Authority is a trusted third party, whose public key is known by all party members and fully trusted. Thus, any party member can easily validate that the certificate is indeed signed by the CA. The CA is responsible for assuring that Alice's public key indeed belongs to Alice. If Alice can prove her public key is related to her using a certificate from a known CA, she can then use her public key to receive encrypted messages, as well as issuing certificates to other players. Browsers have pre-installed certificates of a large number of CAs. Any of these certificates act as a root of trust for any https server. If the certificate provided by the server does not have a valid trust root to a CA, the browser warns the user that it cannot verify that the certificate belongs to the visited https server.

A known standard for certificates is called x.509. It includes fields for

Version of the certificate

Validity period (valid from and valid to)·

Certificate Issuer

Public Key type, length and value

Usage (can the certificate be used to sign other certificates)·

Hash type and value, etc.

Subject

Suppose Alice's private key has been compromised while it is within its validity period. The CA needs to alert other users not to use the corresponding public key. One way is to have a certificate revocation list. This is a blacklist of all revoked certificates maintained by the CA. In practise certification protocols may involve many certification entities namely: Registration Authority, Revocation Authority, Root Certification Authority, Certification Authority. Every entity has a specified role. This architecture complexity leads to a lot of security breaches. Avoiding this architecture is preferable and this can be achieved using Identity-based Cryptography.

4.4 Identity-Based Signatures

An identity-based signature is a digital signature that only needs a message, an identity, and some public information to verify the validity of the signature. That contrasts with standard digital signatures where each signer needs an additional personal public verification key. The original purpose of an identity-based setup is to avoid the need of a CA without being vulnerable to attack such as a man-in-the-middle-attack.

In identity-based cryptography, an identity can be any bit string. The original idea of replacing PKI by identity-based cryptography was to identify any user with a unique bit string. A good example of an identity is an email address, phone number or social security number. The latter is not so practical as a day-to-day identity and often discloses private information, but it can be useful for state identification: e.g. for taxes, social security affairs, etc.

Identity-based cryptography is very flexible on what can be an identity, and consequently there are a lot of indirect applications, including: oblivious transfer, blind IBE, IBS from hierarchical IBE, wicked IBS (and IBE), wildcarded IBS (and IBE), attribute-based encryption, etc.

There are multiple ways to achieve identity-based signatures. For example, one such scheme is referred to as Hierarchical Identity-based Encryption (HIBE). This technique has the advantage of bringing security proofs in the standard model (especially using BBG construction). The main drawback of using HIBE is the usage of Bilinear maps which is a powerful computation mechanism but also a computationally intensive one. Most schemes make use of bilinear mapping which is a heavy computational function. An alternative scheme, which may be used in some embodiments, is described in D. Galindo and F. D. Garcia, "A Schnorr-Like Lightweight Identity-Based Signature Scheme," in Africacrypt, Gammarth, 2009. Their construction avoids bilinear map usage and is based on a double Schnorr signature and is secure in the Random Oracle Model.

4.5 Key Escrow

IBS algorithms typically involve the private key being calculated by a trusted third party, the Private Key Generator (PKG), based on a master secret key msk. The private key (also referred to as a user secret key) is then passed on to the user. There is no guarantee that the PKG is not going to use the private key later. It can also recreate them at will. If msk used to create the party's private key is compromised, a thief would be able to create new keys even for identities already in possession of a user secret key. This all-mighty entity is known as the key escrow. Even when the PKG is trusted, it is a single point of failure from an attacker's point of view. It is worth noting that key escrow is sometimes regarded as a feature for governments or law enforcements, as it provides a window for them to obtain access to criminals' secrets.

Nevertheless, it remains an important challenge to be able to create an encryption or signature algorithm avoiding this Key Escrow. There were multiple attempts to avoid it, for example using multiple separated PKGs or involving the user in the key generation. The former is vulnerable to the collusion of the PKGs and the latter leads to a setup where there is a need for an extra piece of information for each user identity to be able to verify (or encrypt in IBE). Thus, the latter solution is no longer identity based: the extra piece of information is de facto a public key. As mentioned, identity based encryption means identity and public parameters are enough to encrypt a message. Adding an extra piece for each identity is not a public parameter nor a part of the identity. Thus the scheme is not identity based.

However, Key Escrows can be avoided in an applicative way by using a Hardware Security Module (HSM) that stores the master secret key in a way where no outsider can impact the key or any computation. The HSM then produces the user secret keys in an isolated environment.

5. Verification of Non-Native Signatures

Embodiments of the present disclosure relate to the verification of non-native blockchain signatures. A native signature is one which is used to sign transactions according to the blockchain protocol. For instance, in bitcoin the native signature scheme is the Elliptic Curve Digital Signature Algorithm (ECDSA). The native signature ensures the integrity of the signed transaction since the blockchain script engine, when validating the signature, constructs a message based on the spending transaction (and, in some cases, the spent transaction) and verifies the signature is a valid signature for the constructed message. Most blockchain protocols have a dedicated function (e.g. opcode) for verifying native signatures.

A non-native signature scheme contrasts with the native signature scheme in that a valid transaction does not require the non-native signature. Similarly, verification of the non-native signature does not cause the script engine to construct a candidate message based on the spending data and verify the non-native signature based on the constructed message.

Figure 3:
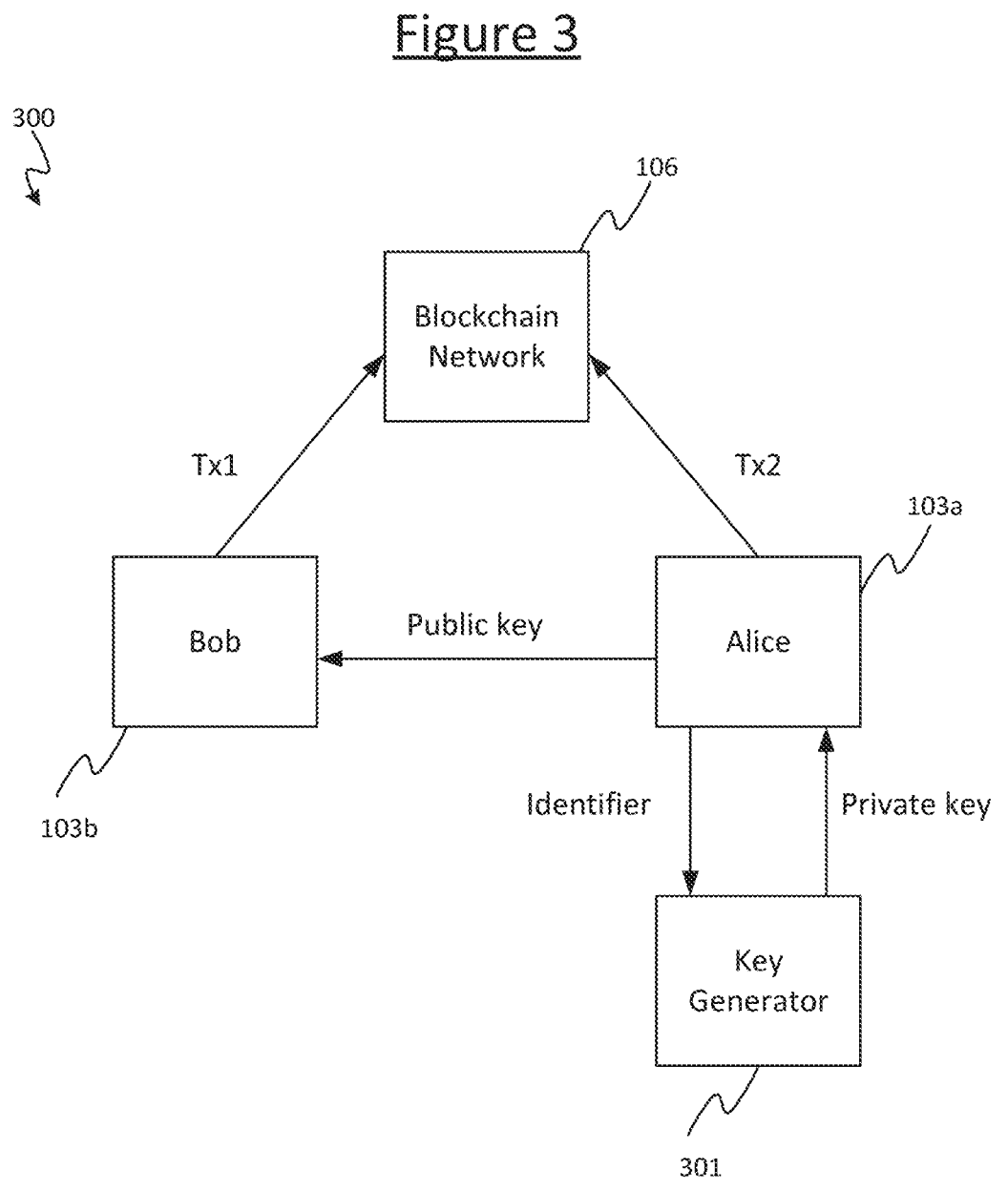

FIG. 3 illustrates an example system 300 for using and verifying non-native signatures. The system 300 includes a first party (Alice 103a), a second party (Bob 103b) and one or more nodes 104 of a blockchain network 106. In some embodiments, the system 300 also includes a key generator 301. Note that the first party and second party are referred to as Alice 103 and Bob 103b respectively merely for convenience. More generally, the first party may be configured to perform some or all of the actions described as being performed by Alice 103 and/or Bob 103 with reference to FIGS. 1 and 2. Similarly, the second party may be configured to perform some or all of the actions described as being performed by Alice 103 and/or Bob 103 with reference to FIGS. 1 and 2.

Bob 103b is configured to generate a first transaction which has an output (and associated locking script) that requires two signatures in order to be unlocked. A first one of those signatures must be of the signature scheme native to the blockchain, e.g. ECDSA for bitcoin. The first signature scheme may use private keys and public keys where by the private key is an integer and the public key is an elliptic curve point. Other blockchains may have a different native signature scheme. The native signature secures the integrity of the signed message, which is based on at least a second transaction that spends (assigns) the output of the first transaction. The locking script comprises a first verification script configured to verify the native signature. A scripting engine (e.g. operated by a node 104) is configured to, when executing the first verification script, construct a candidate message based at least on the second transaction, and verify that the native signature is valid for the candidate and a public key. The public key corresponds to a private key set to the number one. Therefore the native signature is required to have been generated with a private key set equal to the number one. The public key may be included as part of the first verification script. Alternatively, the public key may be included in the unlocking script of the second transaction. In examples where the native signature is ECDSA, the first verification script is configured to verify an ECDSA signature. For example, the first verification script may comprise at least one of OP_CHECKSIG opcode, an OP_CHECK-SIGVERIFY opcode, an OP_CHECKMULTISIG opcode, and an OP_CHECKMULTISIGVERIFY opcode.

The second signature belongs to a different, non-native signature scheme. In general the second signature may belong to any signature that can be verified in script. The second signature scheme may use integers for private keys and elliptic curve points for public keys. Alternatively, the private keys and public keys may take a different form. The second verification script is configured to verify the second signature based on the first signature, or a message comprising the first signature. More accurately, the script engine is configured to, when executing the second verification script, verify that the second signature is a valid signature for a message based on the first signature.

Bob 103b is configured to cause the first transaction to be submitted to the blockchain network 106. For example, Bob 103*b* may submit the first transaction to the blockchain network 106. Bob 103*b* may additionally send the first transaction to Alice 103*a*.

Turning now to Alice 103*a*, Alice 103*a* is configured to obtain (e.g. generate or receive) a second transaction that has an input referencing the output of the first transaction. Alice 103*a* generates a native signature based on the second transaction (and in some examples, the first transaction). The private key used to generate the native signature is set equal to one, making generating and verification of the native signature computationally efficient. This private key is also referred to herein as "the first private key". In some examples, such as when the signature is an ECDSA signature, an ephemeral key used to generate the native signature is also set equal to one. Alice 103*a* then generates a second signature where the signed message is based on the first signature. The first and second signatures are included in the unlocking script of the second transaction's input. Alice 103*a* then submits the second transaction to the blockchain network 106, or to a different entity (e.g. Bob 103*b*) for submitting to the blockchain network 106.

In some examples, the second signature scheme is an identity-based signature scheme. Any suitable identity-based signature scheme may be used. In these examples, the second verification script is configured to verify that the second signature is a valid identity-based signature.

As part of the identity-based signature scheme, Alice 103*a* may have an identifier. Alice's identifier may include one or more of her name, address, date of birth, email address, username, passport number, driving license number, national insurance number, etc. Alice 103*a* also has a user private key. The user private key is generated based on Alice's identifier. The user private key is also referred to herein as "the second private key". In some examples, Alice 103*a* generates her own user private key. In other examples, Alice's user private key is generated by the key generator 301. For example, Alice's user private key may be generated based on a master private key known only to the key generator 301. It is also the case that Alice 103*a* may herself control the master private key used to generate her user private key. In some examples, Alice 103*a* also has a user public key. The user public key may comprise one or more public parameters of the signature scheme, e.g. as described in section 6.1.

Alice 103*a* may be configured to generate the identity-based signature based on the first signature, her identifier, and her user private key. In some examples, the identity-based signature is also based on her user public key. The second verification script may be configured to verify the identity-based signature based on Alice's identifier and the first signature. In some examples, the user public key may also be required to verify the identity-based signature. At least one of the identifier and the user public key may be included in the locking script of the first transaction. Similarly, at least one of the identifier and the user public key may be included in the unlocking script of the second transaction. When the identifier is included in the unlocking script of the second transaction, the second verification script may be configured to verify that the identifier is included in the unlocking script, e.g. by hashing the identifier and verifying that it matches a hash of the identifier in the second verification script.

As mentioned, the user public key comprises one or more public parameters. The parameters may include a prime number (p), an elliptic curve point generator (P) of order of the primer number, a first hash function (H₁), a second hash function (H₂). The user public key may comprise one or more additional parameters. The user private key may be generated by computing a first random value (r), and then computing a first elliptic curve point using the first random value and the generator, e.g. $R=r\cdot P$. The first elliptic curve point is a first value of the user private key. Then, a second value of the user private key is generated based on the first elliptic curve point, the master secret key (z), a first hash generated by hashing the first value of the user private key and the first identifier (id) with the first hash function, e.g. $y=r+z\times H_1 (R\|id) \bmod p$. The user private key is then of the form $usk_{id}=(y, R)$. Note "first", "second", etc. are used merely as labels and do not necessarily imply an order. As discussed, then user private key may be generated by Alice 103*a* or the key generator 301, depending on who controls the master secret key.

The identity-based signature may comprise three values, referred to as signature values. A first signature value may be computed based on a second random value (a) and the generator, e.g. $A=a\cdot P$. A second signature value may be computed based on second random value, the first value of the user private key and a second hash by hashing the first identifier, the first signature value, and the first signature (m), e.g. $b=a+y\times H_2 (id\|A\|m)$. A third signature value is equal to the first value of the user private key. The identity-based signature is then of the form $\sigma=(A, b, R)$.

The second verification script may be configured to verify the identity-based signature by computing a first verification value and a second verification value, each based on the identity-based signature, and determining whether those values are equal. The first verification value is computed based on the first signature value ($\sigma_1$), a first hash (c) and a second hash (d). The first hash is computed by hashing the third signature value ($\sigma_3$) and the first identifier with the first hash function, e.g. $c=H_1 (\sigma_3\|id)$. The second hash is computed by hashing the first identifier, the first signature value, and the first signature with the second hash function, e.g. $d=H_2 (id\|\sigma_1\|m)$. The second verification value is computed based on a second signature value and the generator, e.g. $\sigma_2\cdot P$. The first signature value is then computed as $\sigma_1+d\cdot(\sigma_3+c\cdot Z)$.

In some examples, the locking script of the first transaction may require the unlocking script of the second transaction to contain multiple identity-based signatures, each generated by a different party based on a different identifier and user private key. This enables multi-signature outputs, as discussed below in section 6.4. More generally, the locking script of the first transaction may require the unlocking script of the second transaction to contain multiple second signatures, each generated by a different party.

The second signature may be of a signature scheme other than identity-based signatures. For example, the second signature may be a Schnorr signature or a Rabin signature. The skilled person will be familiar with how to generate and verify Schnorr and Rabin signatures.

Example algorithms for such generation and verification are provided below in section 6.3. As another example, the second signature may be a quantum resistant signature. Any suitable quantum resistance signature may be used, including one of the examples provided in section 6.3.1 below.

6. Example Implementation

This section describes how identity-based signatures (IBS) can be used on the blockchain, e.g. the Bitcoin blockchain, to achieve multiple features that are hard to construct without IBS. Namely:

Identity-based transactions: avoiding the need for PKI in Bitcoin and enabling "Pay to Identity" transactions.

Rights delegation: the ability to delegate the right to unlock an output even after the output is published.

Dynamic MultiSig: a Multisig where new signers can be added after the script creation. Multisig is a locking script that can be unlocked by providing n signatures which correspond to the public keys that are listed in the locking script (can be n out of m).

The following protocol is based on the Galindo-Garcia Schnorr-like IBS because it avoids the use of bilinear maps One scheme that may be used to instantiate IBS directly into bitcoin script is described by Galindo et al. Most other IBS schemes existing in the literature would also work, but lack the same efficiency when implemented in script. This is due to the computation of a function called pairing that is absent Galindo's scheme.

6.1 The Schnorr-like IBS Scheme

This section describes Galindo's scheme in the context of Elliptic Curves. The scheme is now described with additive notations.

---

-Setup($\mathfrak{K}$): Take a security parameter $\mathfrak{K}$ as input,
    Select a group G and a corresponding point generator P of prime order p.
    Choose two different hash functions $H_1$: $\{0, 1\}^* \to \mathbb{Z}_q$, $H_2$: $\{0, 1\}^* \to \mathbb{Z}_q$. The hash functions are different so as to achieve unforgeable security in the random oracle model.
    Randomly select $z \xleftarrow{\$} \mathbb{Z}_p$ and compute $Z = z \cdot P$.
    Set msk = z and mpk = $(G, P, p, Z, H_1, H_2)$ .
    Return the master secret key and master public key: (msk, mpk).
-KeyGen(mpk, msk, id): pick a random $r \xleftarrow{\$} \mathbb{Z}_p$
    Compute $R = r \cdot P$.
    Compute $y = r + z \times H_1(R||id) \bmod p$.
    Return $usk_{id} = (y , R)$. Note that R is not secret and will be given inside any signature from this user.
-Sign(id, m, $usk_{id}$, mpk): pick a random $a \xleftarrow{\$} \mathbb{Z}_p$
    Compute $A = a \cdot P$ .
    Compute $b = a + y \times H_2(id||A||m)$.
    Return $\sigma = (A, b , R)$.
-Verify(mpk, m, id, $\sigma$): parse $\sigma$ as $(\sigma_1, \sigma_2, \sigma_3)$
    Check if $\sigma_2 \cdot P = \sigma_1 + d \cdot (\sigma_3 + c \cdot Z)$ where $d = H_2(id||\sigma_1||m)$ and $c = H_1(\sigma_3||id)$
    If the equation holds, return 1
    Else return 0

--- and can be verified in script. Moreover, this scheme can make use of ECDSA private keys to implicitly authenticate a user.

In some use cases, a trusted entity called a Private Key Generator (PKG) is required to create the private key for any user. This induces key escrow which is inherent to identity-based cryptography. When the main requirement of an application is to avoid PKI, key escrow is problematic. It is possible to address the issue by splitting the key escrow entity into multiple entities and have a threshold key creation. This technique remains secure if these entities don't collude. Alternatively, running key generation inside an HSM can make this entity autonomous and thus unmalleable.

To secure IBS without changing the Bitcoin protocol, embodiments make use of a so-called "dummy signature". This method can be generalized to allow any signatures to be verified securely in script, including Rabin signatures, Schnorr signatures and quantum resistant signatures. The latter leading to quantum resistant transactions.

An IBS is a signature scheme made of four algorithms:

Setup takes as input a security parameter $\mathfrak{K}$. It returns a master secret key msk and a master public key mpk. msk is the powerful secret that a key escrow may hold. mpk is the set of public parameters.

KeyGen takes as Input an mpk, msk, and an identity id. It returns a user secret key $usk_{id}$.

Sign takes as input an identity id, a message m, mpk and a user secret key $usk_{id}$. It returns a signature $\sigma$ on the message m.

Verify takes as input mpk, m, id and $\sigma$. It returns 1 if the signature is valid (on m and by id). It returns 0 if the signature is not valid.

In an identity-based scheme, the public parameters are normally randomly generated while the user's private key is derived from the public key. In a classical public key scheme, it is the opposite: the private key is first generated and then the public key is derived from it.

The scheme is very efficient computationally compared to other IBS because there is no bilinear map to compute. It also enables the signature verification to be done efficiently in script.

This Identity-based signature schemes has been proven secure in the Random Oracle Model (ROM) under the Discrete Logarithm Problem (DLP).

One advantage for choosing this IBS is that it can be efficiently verified in script compared to a pairing based IBS instantiation. Table 1 shows the cost of verifying an IBS in terms of script size.

TABLE 1

| Opcode cost of IBS Verify | | |
|---|---|---|
| Verify Operation | Operation type | Script size (approx . . . ) |
| $(c \cdot Z)$ | Fixed point scalar multiplication | 700 KB |
| $(\sigma_3 + c \cdot Z)$ | Point addition | 2.5 KB |
| $d \cdot (\sigma_3 + c \cdot Z)$ | Scalar multiplication | 1.3 MB |
| $\sigma_1 + d \cdot (\sigma_3 + c \cdot Z)$ | Point addition | 2.5 KB |
| $\sigma_2 \cdot P$ | Fixed point scalar multiplication | 700 KB |
| Verify(mpk, m, id, $\sigma$) | All the above | 2.7 MB |

6.2 Dummy Signatures

In Bitcoin, a digital signature that is not verified by OP_CHECKSIG cannot directly provide the integrity of the transaction data, in particular, the outputs. This applies to IBS described earlier. To fix the issue, a so-called dummy signature is introduced to enhance the security of IBS in Bitcoin transactions. The technique can be generalised to any other type of digital signatures and other blockchains, not just Bitcoin.

6.2.1 how to Sign in Script with an IBS

The opcode OP_CHECKSIG forces the script validation engine to look at the transaction in its almost entirety. This is the only opcode (and a few other related opcodes, including OP_CHECKSIGVERIFY, OP_CHECKMULTISIG and OP_CHECKMULTISIGVERIFY) that fetches the data from the spending transaction. This ensures the integrity of the transaction data and therefore that the signature cannot be replayed in a different transaction. For example, a pay to public key hash (P2PKH) locking script specifies that the next unlocking script needs to include a signature of the transaction. The opcode OP_CHECKSIG in P2PKH verifies the signature with a public key, that, once hashed, is the value specified in the locking script. The message that is signed includes (but is not restricted to) the transaction version, the inputs, and the outputs of the spending transaction (for SIGHASH_ALL). This ensures that the signature cannot be reused in a different spending transaction and hence no replay attack is possible. In a replay attack, for example, if two unlocking scripts require the same user to sign and one has already been unlocked, then one attacker can take the identity-based signature part of the unlocking script from the first transaction and put it in the unlocking script for the second transaction. Since the IBS doesn't include any field of the transaction, the attacker can put anything they desire in this second transaction.

Figure 4A:
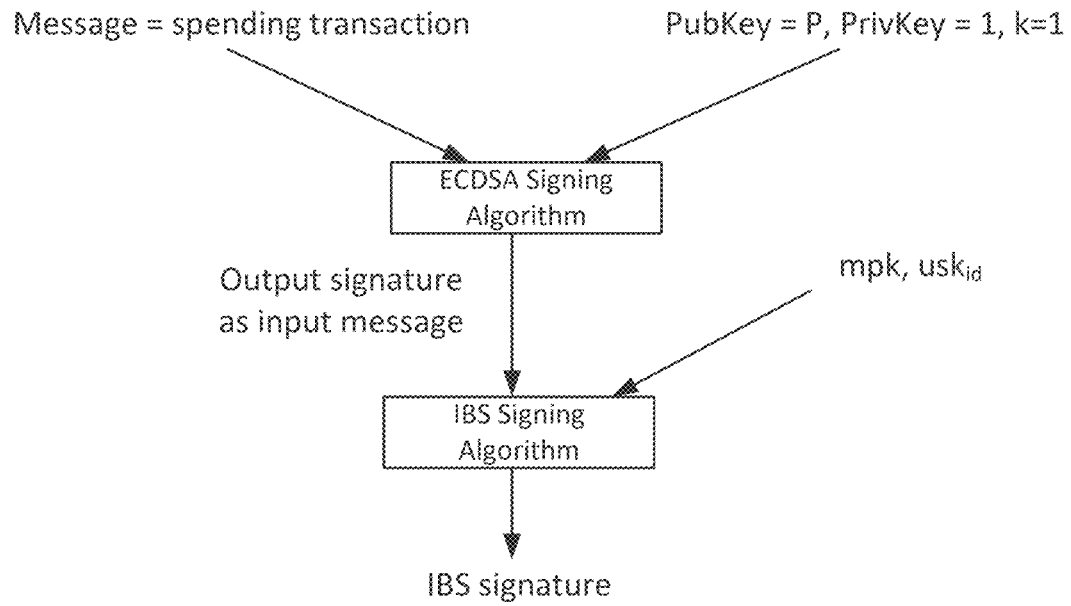
Figure 4B:
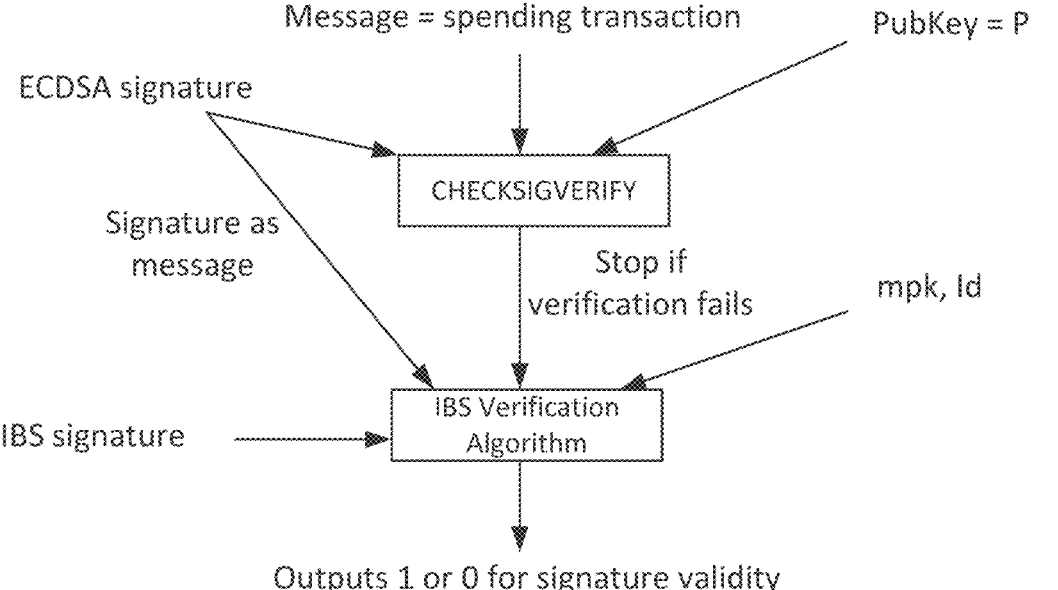

The challenge is to make IBS non-replayable. The method to compute a signature is described in the following paragraph and in FIGS. 4A and 4B. The same fields of the transaction that are used for an ECDSA signature verified by OP_CHECKSIG need to be immutable under IBS. This allows the signature to be linked to this particular transaction. Since OP_CHECKSIG takes the spending transaction as input, it has to be included in script.

The signature to be verified by OP_CHECKSIG will be the dummy signature. It is dummy because it offers integrity without authenticity on the transaction data. The technique uses a dummy signature (verified by OP_CHECKSIG) to ensure integrity of the transaction data and uses an IBS to ensure integrity and authenticity of the dummy signature. As a result, the transaction data will have both authenticity and integrity.

The signer acts as follows:
1. Produce a dummy signature: create an ECDSA signature on the transaction with randomness and private key equal to 1
2. Sign the dummy signature with IBS
3. Include the IBS signature in the unlocking script (along with Id, mpk if not predetermined, and the dummy signature)

That is, the signer produces $Sign_{IBS}$(id, $Sign_{ECDSA}$(transaction, sk=1, k=1), $usk_{id}$, mpk)

The verification works as follows:
1. Verify the dummy signature using OP_CHECKSIG
2. Verify the IBS signature on the dummy signature A locking script will be of the form:

DumSig verification: OP_DUP <P>OP_CHECKSIGVERIFY. This script verifies that DumSig is a signature of the transaction that has been computed with a dummy signing key equal to 1. P here is the generator of the group and it does not depend on the identity of the recipient of the transaction.

IBS verification: <IdA>OP_SWAP <mpk> [Verify]. This script verifies that the IBS is a valid IBS made by the identity IdA on the message DumSig and with respect to the public parameters mpk.

An unlocking script will be of the form:

<SigA>: valid IBS on DumSig by IdA.

<DumSig>: valid dummy signature on the transaction

In these examples the dummy signature is an ECDSA signature. It is fast to compute, and anyone can compute it.

Note that the message (the dummy signature) that is signed by IBS can be extended to include arbitrary data. This allows users to sign part of the unlocking script (excluding IBS itself). This enables conditional payments on an authenticated message. This extension is used in a general context below.

6.3 Generalizing Dummy Signature

Figure 5A:
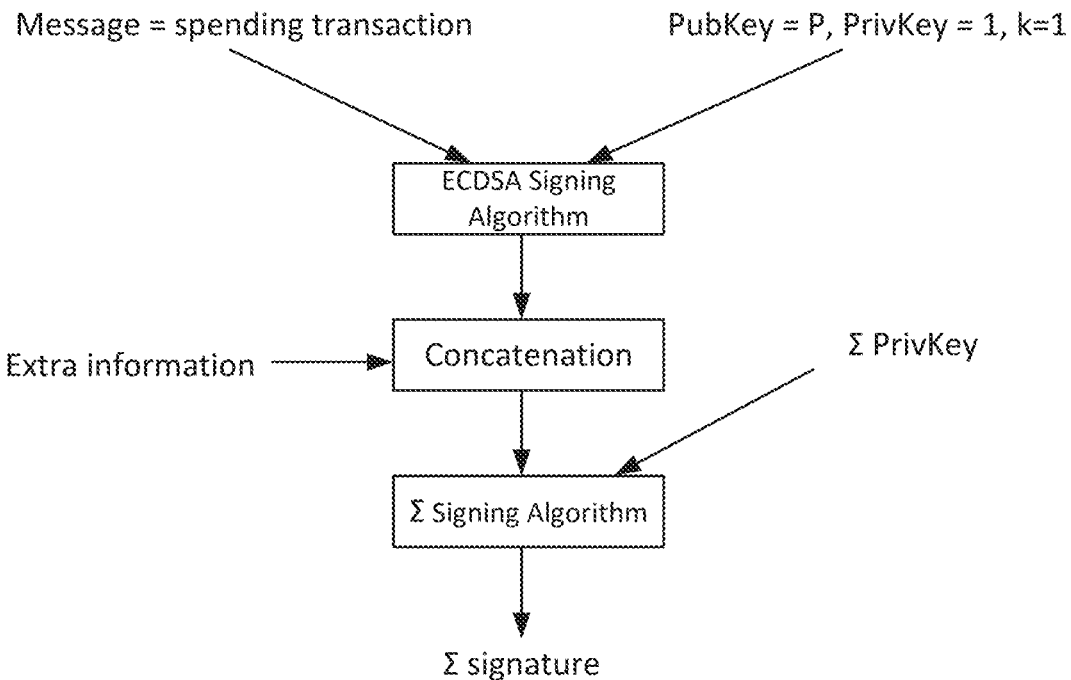
Figure 5B:
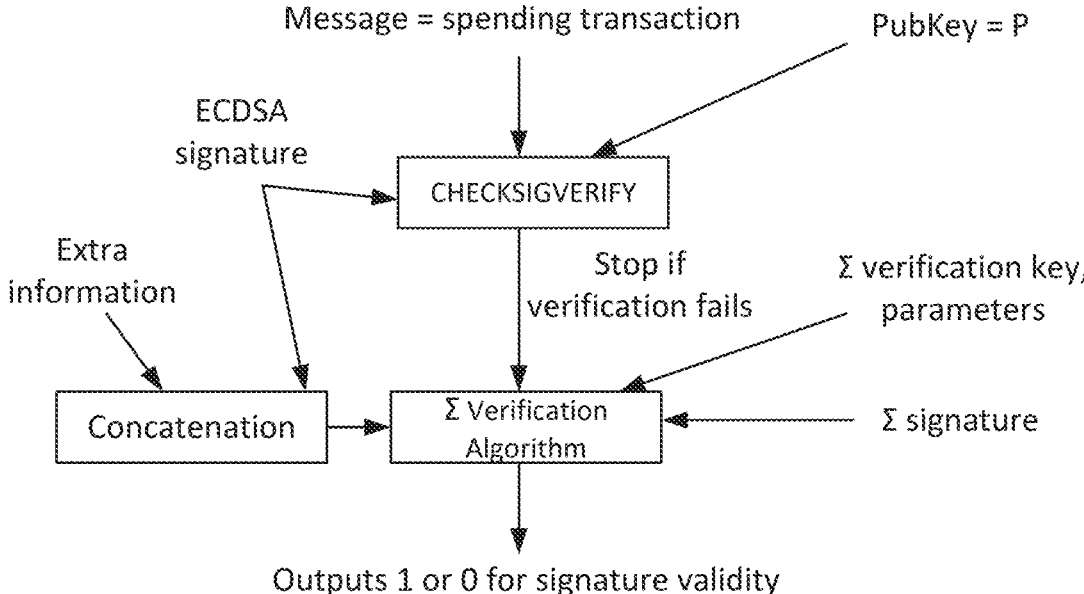

The dummy signature technique described in the previous section can be applied to any type of signature that is verified in script without OP_CHECKSIG. Let's denote an arbitrary signature scheme $\Sigma$. As for IBS the method is to use the dummy signature as the message or part of the message to be signed by $\Sigma$. This is shown in FIGS. 5A and 5B.

6.3.1 Quantum Secure Bitcoin

In the unlikely event of discrete logarithm problem (DLP) becoming an easy problem, ECDSA will not be secure anymore. This can occur if an efficient quantum computer arises. However, a variant of the dummy signature technique can be used to secure a transaction with a different signature $\Sigma$ that remains secure, e.g. a quantum resistant digital signature. In ECDSA, there are two critical elements sk and k. In a dummy signature k and sk are set to 1. The verification of the signature implicitly verifies that sk=1. In the version presented above, the script does not verify that k=1. This is a problem if DLP is easy. Indeed, in ECDSA $s=k^{-1} \cdot (H(m)+r \cdot d_A)$ and r is derived from $g^k$. If k is not fixed and DLP is easy then a $\Sigma$ signature from a transaction m' can be reused to spend a new transaction m with a similar locking script:

r is set to H(m')−H(m).

k is computed from r using the efficient DLP algorithm (that exists because DLP is supposed to be easy here).

DumSig is computed normally using the created k and r.

$\Sigma$ is copied from the spending transaction of m' and to the spending transaction of m This can be prevented with two different methods:

Make the node 104 compute the dummy signature part and take out the dummy signature $\Sigma$ from the unlocking script.

Verify beforehand that the first part of the dummy signature r is correctly computed e.g. r=x mod p where x is the first coordinate of P.

By fixing k and sk the dummy signature is not more than a double SHA256 hash, which can be verified in script. SHA256 being unaffected by quantum algorithms means that the technique is quantum resistant if > is quantum resistant. Quantum resistant signatures pre se are well known and any suitable scheme may be used. See e.g. L. Ducas, E. Kiltz, T. Lepoint, V. Lyubashevsky, P. Schwabe, G. Seiler and D. Sthehlé, "CRYSTALS-Dilithium: A Lattice-Based Digital," in IACR Transactions on Cryptographic Hardware and Embedded Systems, 2017; T. Prest, P.-A. Fouque, J. Hoffstein, P. Kirchner, V. Lyubashevsky, T. Pornin, T. Ricosset, G. Seiler, W. Whyte and Z. Zhang, "Falcon: Fast-Fourier Lattice-based"; and J. Ding, M.-S.

Chen, A. Petzoldt, D. Schmidt, B.-Y. Yang, M. Kannwischer and J. Patarin, "Rainbow, a New Multivariable Polynomial".

6.3.2 Rabin Signatures:

This section describes a Rabin signature that can be equipped with transaction data integrity using the dummy signature. The locking script size to verify a Rabin signature is very small as it requires only a few arithmetic operations on big numbers (addition multiplication and hashing). The script size to verify a Rabin signature is about 5 bytes.

```
Setup( $\mathfrak{R}$ ):
    1. Select a hash function H₁: {0, 1}* → $\mathbb{Z}_{\mathfrak{R}}$
    KeyGen(param):
    1. Select two random prime integers p and q of size $\mathfrak{R}$/2 bits
    2. Select one random b ∈ [1; p · q]
    3. Output sk = (p, q) and pk = (p · q, b)
    Sign(m, sk; r):
    1. Select a random padding U of m (m is the dummy signature)
    2. Solve x(x + b) = H(mU)
    3. If no solution, go to step 1
    4. Output the signature σ = (U, x)
    Verify(m, σ, vk):
    1. Compute x(x + b) and H(mU)
    2. If they are equal output 1, else output 0
```

6.3.3 Schnorr Signature

Another scheme that may be used with the dummy signature is a Schnorr signature. Schnorr signatures have many direct applications such as group signatures, threshold signatures, blind signature, and multi-signatures. They can also be aggregated and verified in batches with just one verification. This last application (multi-signatures) is a motivation to change the bitcoin protocol to enable Schnorr signature verification in script. The techniques described herein provide for secure use and verification of Schnorr signatures without changing the bitcoin protocol.

```
Setup( $\mathfrak{R}$ ):
    1. Select a hash function H₁: {0, 1}* → $\mathbb{Z}_p$
    KeyGen(param):
    2. Randomly select z ← $\mathbb{Z}_p$ and compute Z = z · P
    3. Output sk = z and pk = Z
    Sign(m, sk; r):
    5. Select a random r ← $\mathbb{Z}_p$
    6. Compute R = r · P, e = H(R∥m) and s = r − ze
    7. Output the signature σ = (e, s)
    Verify(m, σ, vk):
    3. Computer r' = s · P + e · Z and e' = H(r'∥m)
    4. If e = e' output 1, else output 0
```

The script size to verify a Schnorr signature is about 1.4 MB (2 fixed scalar multiplications and 1 point addition).

6.4 Applications

An IBS private key or user secret key is a signing key that embeds immutable information. This information was created to define an entity. However, it can be any bit string. If the signature verification passes, the verifier is assured that the message is indeed coming from the entity whose identity is represented by the bit string.

There are several ways to use IBS in bitcoin, each leading to different applications. Two are described here:

In one case, a general system is set up where everyone shares the same master public key. It implies that there is only one master secret key which can be held by one entity (leading to a key escrow which has been discussed above). This setup avoids the usage of Public Key Infrastructure which is a huge communication and computational burden.

In another case, individuals hold their own IBS scheme. In this context, any user can use their ECDSA signing key as a master secret key and construct the master public key with its verification key. It leads to several application, include two that are described below: Certification Authority Power Delegation and Dynamic Multisig.

6.4.1 P2ID and P2IDH

This section describes transaction templates that may be used to avoid PKI using IBS. See Table 2 and 3, in which the locking script is denoted as Pay-to-ID (P2ID). In the same ways as P2PKH, it is possible to not include the identity of the recipient of the transaction in the locking script. A hash of it may be included in the locking script instead and the identity may be included in the unlocking script. It is referred to herein as pay to Identity Hash (P2IDH). This is shown in Table 4 and 5.

TABLE 2

| Transaction to Alice (IdA) pay to Identity (mpk, m, id, σ) Tx₀ | | | | |
|---|---|---|---|---|
| Version | 1 | Locktime | | 0 |
| In-count | 1 | Out-count | | 1 |
| Input list | | | | |
| Unlocking | | | Output list | |
| Outpoint | script | nSeq | Value | Locking script |
| | | FFFFFFFF | x | OP_DUP \<P\> OP_CHECKSIGVERIFY \<IdA\> OP_SWAP \<mpk\> [Verify] |

TABLE 3

| Transaction spent by Alice (IdA) using IBS Tx₁ | | | | |
|---|---|---|---|---|
| Version | 1 | Locktime | | 0 |
| In-count | 1 | Out-count | | 1 |
| Input list | | | Output list | |
| Outpoint | Unlocking script | nSeq | Value | Locking script |
| Tx₀ ∣ ∣0 | \< SigA \>, \< DumSig \> | FFFFFFFF | x | |

TABLE 4

| Transaction to Alice (IdA) pay to Identity Hash Tx₂ | | | | |
|---|---|---|---|---|
| Version | 1 | Locktime | | 0 |
| In-count | 1 | Out-count | | 1 |
| Input list | | | | |
| Out-point | Unlock-ing script | nSeq | Output list | |
| | | | Value | Locking script |
| Out-pointA | | FFFFFFFF | 01110010 | OP_DUP \<P\> OP_CHECKSIGVERIFY OP_OVER |

TABLE 4-continued

| Transaction to Alice (IdA) pay to Identity Hash |
| --- |
| Tx$_2$ |
| OP_HASH256 <H$_{IdA}$> |
| OP_EQUALVERIFY |
| <mpk> [Verify] |

TABLE 5 transaction spent by Alice (IdA) using Identity hash in IBS
Tx$_3$

| Version | 1 | Locktime | 0 |
| --- | --- | --- | --- |
| In-count | 1 | Out-count | 1 |

| Input list | | | Output list | |
| --- | --- | --- | --- | --- |
| Outpoint | Unlocking script | nSeq | Value | Locking script |
| Tx$_2$ \| \|0 | < SigA >, < IdA >, < DumSig > | FFFFFFFF | x | |

6.4.2 Rights Delegation

Figure 6:
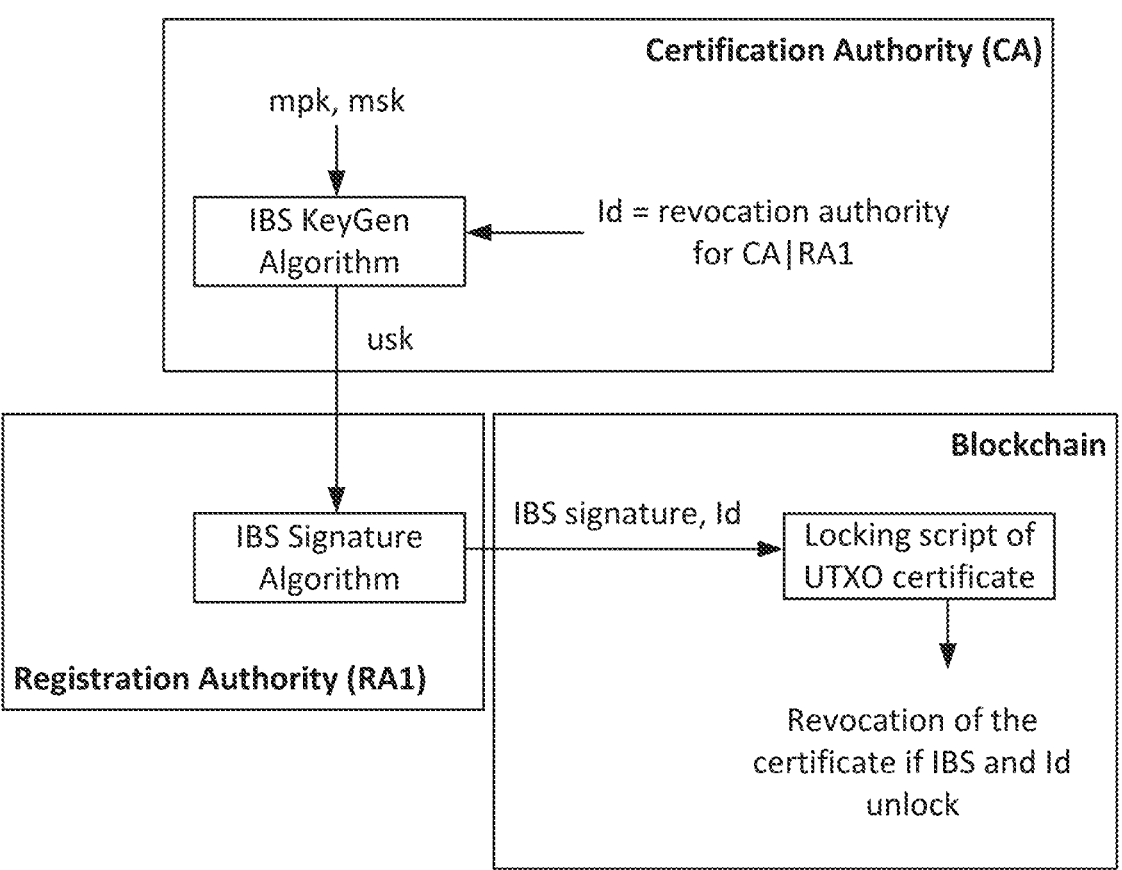

Any entity can act as a PKG to delegate their signing rights to others. In this use case, key escrow becomes a feature. Even after a locking script is created and the transaction containing the locking script is published, new private keys can be generated and given to the delegates in order to unlock the output. The following section describes the case of a certification revocation rights delegation. More precisely, in this example valid certificates are represented by a UTXO on the blockchain. The certification authority with its own signing key needs to handle a lot of operations. In a normal PKI context, there are multiple entities that have different roles over the certification protocol: the Registration Authority, Certification Authority (CA), Revocation Authority (RA). All these entities can be superseded by a root certification authority that can hold multiple instances of Public Key Infrastructure. With the IBS technique described herein, a root CA can create a user secret key for any entity whose identity reflects their role. FIG. 6 illustrates the example of a revocation authority RA1 being delegated the right to revoke a certificate. It works as follows:

1. The certification authority CA creates the pair (mpk, msk) using its ECDSA signing key as msk (implying that Z in mpk is equal to the ECDSA verification key of CA)
2. The certification authority CA creates a user secret key usk for the revocation authority RA1 using its master secret key msk and the identity Id$_{RA1}$="revocation authority for CA|RA1"
3. usk is then passed on to RA1
4. Once a transaction needs to be spent in order to revoke a certificate, RA1 will produce a signature (IBS+ DumSig) on the transaction and include this signature and its identity Id$_{RA1}$ in the unlocking script
5. If Id$_{RA1}$ begins with "revocation authority for CA" and the signature is valid, the transaction will be valid and accepted. Thus, the certificate is revoked.

The information in the identity enables or disables different types of actions (here spending the transaction would only be possible for an entity in charge of the revocation of certificates). Moreover, the master public key of these delegated entities includes the verification key of the CA, it allows to directly link the sub entities with the superior entity. Table 6 shows a locking script for a transaction where a certificate spending can be delegated to a revocation authority. In this example, a special template isa used for the identity to be recognized as a revocation identity. In practice, any format of the identity will work as long as it is publicly known. To spend the UTXO the unlocking script should contain any (Sig, Id, DumSig) such that 1. Sig verifies with respect to Id and PK$_{CA*}$ as mpk
2. Id begins with "revocation authority for CA"
3. DumSig is a valid dummy signature of the transaction. This is described in Table 6 and 7.

TABLE 6

Locking script of transaction which delegates certificate revocation
Tx$_4$

| Input list | | | |
| --- | --- | --- | --- |
| | Unlocking | | Output list |
| Outpoint | script | Value | Locking script |
| | | | OP_DUP <P> OP_CHECKSIGVERIFY OP_OVER [Check Id = "Revocation Authority of CA/ . . . "] <PK$_{CA}$> [Verify] |

TABLE 7

Unlocking script for spending a certificate with a delegated authority
Tx$_5$

| Input list | | Output list | |
| --- | --- | --- | --- |
| Outpoint | Unlocking script | Value | Locking script |
| TxID$_4$ \| \|0 | < Sig >, < Id >, < DumSig > | | |

6.4.3 Dynamic MultiSig

The opcode OP_CHECKMULTISIG allows for the assignment of a transaction output with n signature(s) of m of the PK owners specified in the locking script. But this opcode is not dynamic, public keys (and hence private keys) must be generated at the time of creating the locking script.

A PKG that creates keys for all users in the MultiSig group and a template for the identities provides an efficient way to implement multi-signatures. It leads to key escrow but since MultiSig can be used among entities of the same corporation or between dependent entities, it is not a problem.

Herein, an IBS based Multisig is referred to as an n-MultiSig on k conditions. Conditions are restrictions on the identities. As an example, this section describes a case of a 1-multisig on 2 conditions:

"Condition 1: being part of nChain"

Condition 2: being a researcher.

To facilitate the condition verification, we can think about a template of the form: "country||company||position||surname||first name" thus an identity can be "France||nChain-||researcher||Germouty||Paul". Using this example template, it is possible to create a MultiSig for any researcher at nChain by forcing the identity to have as 2nd and 3rd field as "nChain" and "researcher". This is illustrated through transaction templates in Table 8 and 9.

TABLE 8

Example of a locking script locked to a Researcher at nChain using dynamic MultiSig
$Tx_6$

| Input list | | | Output list |
|---|---|---|---|
| Outpoint | Unlocking script | Value | Locking script |
| | | | OP_DUP <P> OP_CHECKSIGVERIFY OP_OVER [Check Id="\*\|nChain\|Researcher\|...."] < $mpk_{PKG}$ > [Verify] |

TABLE 9

Example of an unlocking script for Researcher at nChain using dynamic MultiSig
$Tx_7$

| Input list | | Output list | |
|---|---|---|---|
| Outpoint | Unlocking script | Value | Locking script |
| $TxID_6$ \| \|0 | < Sig >, < Id >, < DumSig > | | |

In a general context we have n-MultiSig on k conditions. This means that n signatures are required with k different conditions enforced using regular expression in script on identities. The signatures will be thus accepted if and only if they are of number n and if the identity of each signer satisfies the k conditions. This is shown in the general template transactions in Tables 10 and 11:

TABLE 10

Locking script for assigning a dynamic n-MultiSig on k conditions
$Tx_8$

| Input list | | | Output list |
|---|---|---|---|
| Outpoint | Unlocking script | Value | Locking script |
| | | | OP_DUP <P> OP_CHECKSIGVERIFY |

$$\left\{ \begin{array}{l} \text{OP\_DUP OP\_TOALTSTACK OP\_OVER} \\ \text{[for all } j \in \{1, k\} \text{ check } Id_j \text{ field meet condition } C_j] \\ < mpk_{PKG} > \text{[Verify] OP\_FROMALTSTACK} \end{array} \right\}_{i=1}^{n}$$

TABLE 11

Unlocking script for a dynamically assigned n-MultiSig on k conditions
$Tx_9$

| Input list | | Output list | |
|---|---|---|---|
| Outpoint | Unlocking script | Value | Locking script |
| $TxID_8$\| \|0 | $\left\{ \begin{array}{l} < Sig_i >, \\ < Id_i > \end{array} \right\}_{i=1}^{n}$, < DumSig > | | |

The size of the Locking script grows linearly in the size of n but not k. Indeed, there are n verification of the IBS to perform. One set of opcodes is needed for each signature;

thus, the size of the locking script will grow linearly in the size of n. In the contrary, the number of conditions to verify affects very little the size of the locking script: a string comparison will be performed in any case, the number of conditions increase only the number of equality check in this bit to bit verification.

The possible number of signers is infinite with a fixed locking script size: in the example above, the condition researcher at nChain can be true for as many identities as the PKG wants since it can create identities at will.

One could argue that the authority in a PKI environment could do the same by distributing the same public key to every user in the multisig and let them sign directly with the public key. However this has two major problems: 1) it is impossible to know which user signed, and 2) it is not flexible nor scalable, whereas in the example above, it is possible to produce different conditions for Multisig, it could be everyone from nChain, or every person from nChain in France, etc.

As mentioned before, the Multisig scheme described herein is dynamic: any user can be added to the set of authorized signatures if the PKG produces and transmits a valid user secret key to this user. This can be done even after the creation of the locking script.

The CA Power Delegation can be viewed as a special case of dynamic MultiSig. For the revocation example described above it can be seen as a 1 MultiSig on 1 condition. The condition being: first part of the identity is 'can revoke for CA'.

6.5 Efficiency Comparison

The section compares the identity-based signature used in Bitcoin to other IBS schemes. The efficiency is described with multiplicative notation, ignoring multiplication and addition in $\mathbb{Z}_p$ for clarity.

BBG IBS (D. Boneh, X. Boyen and E. Goh, "Hierarchical Identity Based Encryption with Constant Size Ciphertext," in EUROCRYPT, Aahrus, 2005.) is based on bilinear map and is secure in the standard model under the bilinear Diffie Hellman problem. It is an adaptation of Hierarchical Identity-based Encryption (HIBE) (A. S. Craig Gentry, "Hierarchical ID-based cryptography.," in ASIACRYPT, Queenstown, 2002.) into IBS.

The three other schemes are secure in the more flexible model called Random Oracle Model. This model is justified because of the core use of hash functions in these schemes. GS IBS is another adaptation from HIBE to IBS, based on one of the first HIBE created. It is secure under the Constructive Diffie Hellman (CDH). GG IBS (D. Galindo and F. D. Garcia, "A Schnorr-Like Lightweight Identity-Based Signature Scheme," in Africacrypt, Gammarth, 2009.) is the one used to instantiate IBS in Bitcoin as described herein. It does not use bilinear maps and is secure under Discrete Logarithm Problem (DLP).

Table 14 compares ECDSA to the dummy signature scheme. The efficiency is quite different because of the simplifications made in dummy signature. The signing time is negligible by construction. On top of that, in P2PKH the public key of the signer needs to be included in the unlocking script, we don't need that for dummy signature as it is always equal to the generator P and thus implicit.

TABLE 13

| | | | | Security | |
| Scheme | Signature size | Signing time | Verification time | assump-tion | Security model |
| --- | --- | --- | --- | --- | --- |
| BBG IBS | 1 elem of $\mathbb{G}_1$, 1 elem of $\mathbb{G}_2$ | 1 exp in $\mathbb{G}_1$, 1 exp in $\mathbb{G}_2$ | 2 bil. maps, 0.5 exp. in $\mathbb{G}$ | Con-structive BDHE | SM |
| GS IBS | 2 elem of $\mathbb{G}$ | 2 exp. in $\mathbb{G}$ | 3 bil. Maps | CDH | ROM |
| GG IBS (used in some embodiments) | 2 elem of $\mathbb{G}$, 1 elem. of $\mathbb{Z}_p$ | 1 exp. in $\mathbb{G}$ | 4 exp. in $\mathbb{G}$, 2 mult. in $\mathbb{G}$ | DLP | ROM |

TABLE 14

| | | | | Security | |
| Scheme | Signature size | Signing time | Verification time | assump-tion | Security model |
| --- | --- | --- | --- | --- | --- |
| ECDSA | 2 elem of $\mathbb{F}_q$ | 1 exp. in $\mathbb{G}$, 1 inv in $\mathbb{Z}_p$ | 2 exp. in $\mathbb{G}$, 1 mult. in $\mathbb{G}$ | DLP | ROM |
| Dummy Signature | 2 elem of $\mathbb{F}_q$ | Negligible | 2 exp. in $\mathbb{G}$, 1 mult. in $\mathbb{G}$ | DLP | ROM |

In these tables, the following notation is used:

$\mathbb{G}_1$, $\mathbb{G}_2$ denote the two groups needed to perform bilinear map.

$\mathbb{G}$ is the group for non bilinear map-based scheme operations, this is the group where DLP and CDH need to be hard in order to have a secure signature.

"exp." stands for exponentiation, "inv." for inverse operation, "mult." for multiplication.

7. Further Remarks

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

Some embodiments have been described in terms of the blockchain network implementing a proof-of-work consensus mechanism to secure the underlying blockchain. However proof-of-work is just one type of consensus mechanism and in general embodiments may use any type of suitable consensus mechanism such as, for example, proof-of-stake, delegated proof-of-stake, proof-of-capacity, or proof-of-elapsed time. As a particular example, proof-of-stake uses a randomized process to determine which blockchain node 104 is given the opportunity to produce the next block 151. The chosen node is often referred to as a validator. Blockchain nodes can lock up their tokens for a certain time in order to have the chance of becoming a validator. Generally, the node who locks the biggest stake for the longest period of time has the best chance of becoming the next validator.

It will be appreciated that the above embodiments have been described by way of example only. More generally there may be provided a method, apparatus or program in accordance with any one or more of the following Statements.

Statement 1. A computer-implemented method for enabling non-native blockchain signatures to be verified in-script, wherein the method is performed by a first party and comprises:

obtaining a second blockchain transaction, wherein the second blockchain transaction references a first blockchain transaction;

generating a first signature based on at least the second blockchain transaction, wherein a first private key used to generate the first signature is set equal to one;

generating a second signature based on the first signature, wherein the first signature is a native blockchain signature and the second signature is a non-native blockchain signature;

including the first signature and the second signature in an unlocking script of the second blockchain transaction for verification when the unlocking script is executed together with a locking script of the first blockchain transaction; and causing the second blockchain transaction to be submitted to a blockchain network.

First signature signs a first message, where first message is based on the second transaction. Second signature signs a second message, wherein second message comprises the first signature.

In other words, first signature is of a first signature scheme and the second signature is of a second, different signature scheme. A native blockchain signature is a signature that, when verified by a blockchain script engine, forces the script engine to obtain the fields of the first blockchain transaction (i.e. the spending transaction) during the verification process). Similarly, a native signature is a signature that can be verified in-script using a dedicated function/opcode.

Statement 2. The method of statement 1, wherein the first signature is an ECDSA signature.

Statement 3. The method of statement 1 or statement 2, wherein an ephemeral key used to generate the first signature is set equal to one.

Statement 4. The method of any of statements 1 to 3, wherein the second signature is one of:

a quantum resistant signature, a Rabin signature, a Schnorr signature.

Statement 5. The method of any preceding statement, wherein the second signature is an identity-based signature.

Statement 6. The method of statement 5, wherein the first party has a first identifier, a second private key, and a second public key, wherein the second private key is based on the first identifier, and wherein the second signature is based on the first signature, the first identifier, the second private key.

Statement 7. The method of statement 6, wherein the first identifier comprises at least part of one or more of the following: a name, an address, a date of birth, an email address, a username, a passport number, a driving license number, a national insurance number.

Statement 8. The method of statement 5 or statement 6, wherein the second public key comprises a set of parameters, the set of parameters including at least a prime number, an elliptic curve point generator of order of the primer number, a first hash function, a second hash function, and wherein the second private key is generated by:

computing a first elliptic curve point based on a first random value and the elliptic curve generator, wherein the first elliptic curve point is a first value of the second private key;

computing a second value of the second private key based on the first elliptic curve point, a master secret key, a first hash generated by hashing the first elliptic curve point and the first identifier with the first hash function.

Statement 9. The method of statement 8, wherein the second private key is generated by a key generator having the master secret key, and wherein the method comprises receiving the second private key from the key generator.

Statement 10. The method of statement 8 or statement 9, wherein the second signature is generated by:

computing a first value of the second signature based on a second random value and the elliptic curve generator;

computing a second value of the second signature based on the second random value, the first value of the second private key, a second hash generated by hashing the first identifier, the first value of the second signature, and the first signature; and setting a third value of the second signature as the first value of the second private key.

Statement 11. The method of any of statements 6 to 10, comprising including the first identifier in the unlocking script of the second blockchain transaction.

Statement 12. The method of any of statements 5 to 11, wherein the unlocking script of the second blockchain transaction comprises one or more additional identity-based signatures, each generated by a different party.

Statement 13. The method of any preceding statement, wherein the locking script of the first blockchain transaction represents a certificate, and wherein submitting the second blockchain transaction represents a revocation of the certificate.

Statement 14. A computer-implemented method of verifying non-native blockchain signatures in-script, wherein the method is performed by a second party and comprises:

generating a first blockchain transaction comprising a locking script, wherein the locking script comprises a first verification script and a second verification script, wherein when the locking script of the first blockchain transaction is executed together with an unlocking script of a second blockchain transaction, the first verification script is configured to verify a first signature based on a first public key corresponding to a first private key set equal to one, and the second verification script is configured to verify a second signature, wherein the first signature is a native blockchain signature and the second signature is a non-native blockchain signature; and causing the first blockchain transaction to be submitted to a blockchain network.

Statement 15. The method of statement 14, wherein the first verification script is configured to verify an ECDSA signature.

For example, the first verification script may comprise at least one of: an OP_CHECKSIG opcode, an OP_CHECK-SIGVERIFY opcode, an OP_CHECKMULTISIG opcode, and an OP_CHECKMULTISIGVERIFY opcode.

Statement 16. The method of statement 14 or statement 15, wherein the second verification script is configured to verify an identity-based signature.

Statement 17. The method of statement 16, wherein the first party has a first identifier, a second private key, and a second public key, wherein the second private key is based on the first identifier, and wherein the second signature verification script is configured to verify the second signature based on the first identifier, the second public key, and the first signature.

Statement 18. The method of statement 17, wherein the second public key comprises a set of parameters, the set of parameters including at least a prime number, an elliptic curve point generator of order of the prime number, a first hash function, a second hash function, and a public value corresponding to a master secret key, wherein the second signature comprises a first value, a second value, and a third value, and wherein the second verification script is configured to verify the second signature by:

computing a first verification value based on the first value, a first hash generated by hashing the third value and the first identifier with the first hash function, a second hash generated by hashing the first identifier, the first value, and the first signature with the second hash function, and the public value corresponding to the master secret key;

computing a second verification value based on the second value and the elliptic curve generator; and verifying that the first verification value corresponds to the second verification value.

Statement 19. The method of statement 17 or statement 18, wherein the locking script of the first blockchain transaction comprises the first identifier, and wherein the second verification script is configured to verify that the unlocking script of the first blockchain transaction comprises the first identifier.

Statement 20. The method of any of statements 16 to 19, wherein the locking script of the first blockchain transaction comprises a hash of the first identifier, and wherein the second verification script is configured to verify that the unlocking script of the first blockchain transaction comprises the first identifier by hashing the first identifier and comparing the result with hash of the first identifier.

Statement 21. The method of any of statements 16 to 19, wherein the locking script comprises a plurality of instances of the second verification script, and wherein when executed, each instance of the second verification script is configured to verify a respective identify-based signature included in the unlocking script of the second blockchain transaction.

Statement 22. The method of any of statements 16 to 21, wherein the locking script is configured to verify that the unlocking script of the second blockchain transaction comprises an identifier, the identifier having one or more predetermined fields.

Statement 23. The method of statement 22, wherein the locking script does not require a specific identifier to be included in the unlocking script of the second blockchain transaction.

Statement 24. The method of statement 14 or statement 15, wherein the second signature is one of:

a quantum resistant signature, a Rabin signature, a Schnorr signature.

Statement 25. Computer equipment comprising:

memory comprising one or more memory units; and processing apparatus comprising one or more processing units, wherein the memory stores code arranged to run on the processing apparatus, the code being configured so as when on the processing apparatus to perform the method of any of statements 1 to 24.

Statement 26. A computer program embodied on computer-readable storage and configured so as, when run on one or more processors, to perform the method of any of statements 1 to 24.

According to another aspect disclosed herein, there may be provided a method comprising the actions of the first party and the second party.

According to another aspect disclosed herein, there may be provided a system comprising the computer equipment of the first party and the second party.

The invention claimed is:

1. A computer-implemented method for enabling non-native blockchain signatures to be verified in-script, wherein the method is performed by a first party and comprises:

obtaining a second blockchain transaction, wherein the second blockchain transaction references a first blockchain transaction;

generating a first signature based on at least the second blockchain transaction, wherein a first private key used to generate the first signature is set equal to one;

generating a second signature based on a message comprising the first signature, wherein the first signature is a native blockchain signature and the second signature is a non-native blockchain signature;

including the first signature and the second signature in an unlocking script of the second blockchain transaction for verification when the unlocking script is executed together with a locking script of the first blockchain transaction; and causing the second blockchain transaction to be submitted to a blockchain network.

2. The method of claim 1, wherein the first signature is an Elliptic Curve Digital Signature Algorithm (ECDSA) signature.

3. The method of claim 1, wherein an ephemeral key used to generate the first signature is set equal to one.

4. The method of claim 1, wherein the second signature is one of:

a quantum resistant signature, a Rabin signature, a Schnorr signature.

5. The method of claim 1, wherein the second signature is an identity-based signature.

6. The method of claim 5, wherein the first party has a first identifier, a second private key, and a second public key, wherein the second private key is based on the first identifier, and wherein the second signature is based on the first signature, the first identifier, the second private key.

7. The method of claim 6, wherein the first identifier comprises at least part of one or more of the following: a name, an address, a date of birth, an email address, a username, a passport number, a driving license number, a national insurance number.

8. The method of claim 6, wherein the second public key comprises a set of parameters, the set of parameters including at least a prime number, an elliptic curve point generator of order of the prime number, a first hash function, a second hash function, and wherein the second private key is generated by:

computing a first elliptic curve point based on a first random value and the elliptic curve generator, wherein the first elliptic curve point is a first value of the second private key;

computing a second value of the second private key based on the first elliptic curve point, a master secret key, a first hash generated by hashing the first elliptic curve point and the first identifier with the first hash function.

9. The method of claim 8, wherein the second signature is generated by:

computing a first value of the second signature based on a second random value and the elliptic curve generator;

computing a second value of the second signature based on the second random value, the first value of the second private key, a second hash generated by hashing the first identifier, the first value of the second signature, and the first signature; and setting a third value of the second signature as the first value of the second private key.

10. The method of claim 1, wherein the locking script of the first blockchain transaction represents a certificate, and wherein submitting the second blockchain transaction represents a revocation of the certificate.

11. A computer-implemented method of generating blockchain transactions for verifying non-native blockchain signatures in-script, wherein the method is performed by a second party and comprises:

generating a first blockchain transaction comprising a locking script, wherein the locking script comprises a first verification script and a second verification script, wherein when the locking script of the first blockchain transaction is executed together with an unlocking script of a second blockchain transaction, the first verification script is configured to verify a first signature based on a first public key corresponding to a first private key set equal to one, and the second verification script is configured to verify a second signature based on a message comprising the first signature, wherein the first signature is a native blockchain signature and the second signature is a non-native blockchain signature; and causing the first blockchain transaction to be submitted to a blockchain network.

12. The method of claim 11, wherein the second verification script is configured to verify an identity-based signature.

13. The method of claim 12, wherein a first party has a first identifier, a second private key, and a second public key, wherein the second private key is based on the first identifier, and wherein the second signature verification script is configured to verify the second signature based on the first identifier, the second public key, and the first signature.

14. The method of claim 13, wherein the second public key comprises a set of parameters, the set of parameters including at least a prime number, an elliptic curve point generator of order of the prime number, a first hash function, a second hash function, and a public value corresponding to a master secret key, wherein the second signature comprises a first value, a second value, and a third value, and wherein the second verification script is configured to verify the second signature by:

computing a first verification value based on the first value, a first hash generated by hashing the third value and the first identifier with the first hash function, a second hash generated by hashing the first identifier, the first value, and the first signature with the second hash function, and the public value corresponding to the master secret key;

computing a second verification value based on the second value and the elliptic curve generator; and verifying that the first verification value corresponds to the second verification value.

15. The method of claim 13, wherein the locking script of the first blockchain transaction comprises the first identifier, and wherein the second verification script is configured to verify that the unlocking script of the first blockchain transaction comprises the first identifier.

16. The method of claim 13, wherein the locking script of the first blockchain transaction comprises a hash of the first identifier, and wherein the second verification script is configured to verify that the unlocking script of the first blockchain transaction comprises the first identifier by hashing the first identifier and comparing the result with hash of the first identifier.

17. The method of claim 12, wherein the locking script comprises a plurality of instances of the second verification script, and wherein when executed, each instance of the second verification script is configured to verify a respective identify-based signature included in the unlocking script of the second blockchain transaction.

18. The method of claim 12, wherein the locking script is configured to verify that the unlocking script of the second blockchain transaction comprises an identifier, the identifier having one or more predetermined fields.

19. A non-transitory computer readable media comprising a computer program and configured so as, when run on one or more processors, the one or more processors perform a method of generating blockchain transactions for verifying non-native blockchain signatures in-script, wherein the method is performed by a second party and comprises:

generating a first blockchain transaction comprising a locking script, wherein the locking script comprises a first verification script and a second verification script, wherein when the locking script of the first blockchain transaction is executed together with an unlocking script of a second blockchain transaction, the first verification script is configured to verify a first signature based on a first public key corresponding to a first private key set equal to one, and the second verification script is configured to verify a second signature based on a message comprising the first signature, wherein the first signature is a native blockchain signature and the second signature is a non-native blockchain signature; and causing the first blockchain transaction to be submitted to a blockchain network.

\* \* \* \* \*